INVENTORS
LUCAS J. BAZIN
ROBERT A. DISCHERT &
DAVID M. TAYLOR
BY W. H. Sprouagle
Attorney United States Patent Office 3,283,067 Patented Nov. 1, 1966

3,283,067

SIGNAL PROCESSING APPARATUS FOR COLOR SYSTEMS UTILIZING SEPARATE LUMINANCE SIGNAL PICKUP

Lucas J. Bazin, Stratford, Robert A. Dischert, Burlington, and David M. Taylor, Edgewater Park Township, Burlington County, N.J., assignors to Radio Corporation of America, a corporation of Delaware Filed Apr. 3, 1964, Ser. No. 357,030
3 Claims. (Cl. 178—5.4)

Figure 2:
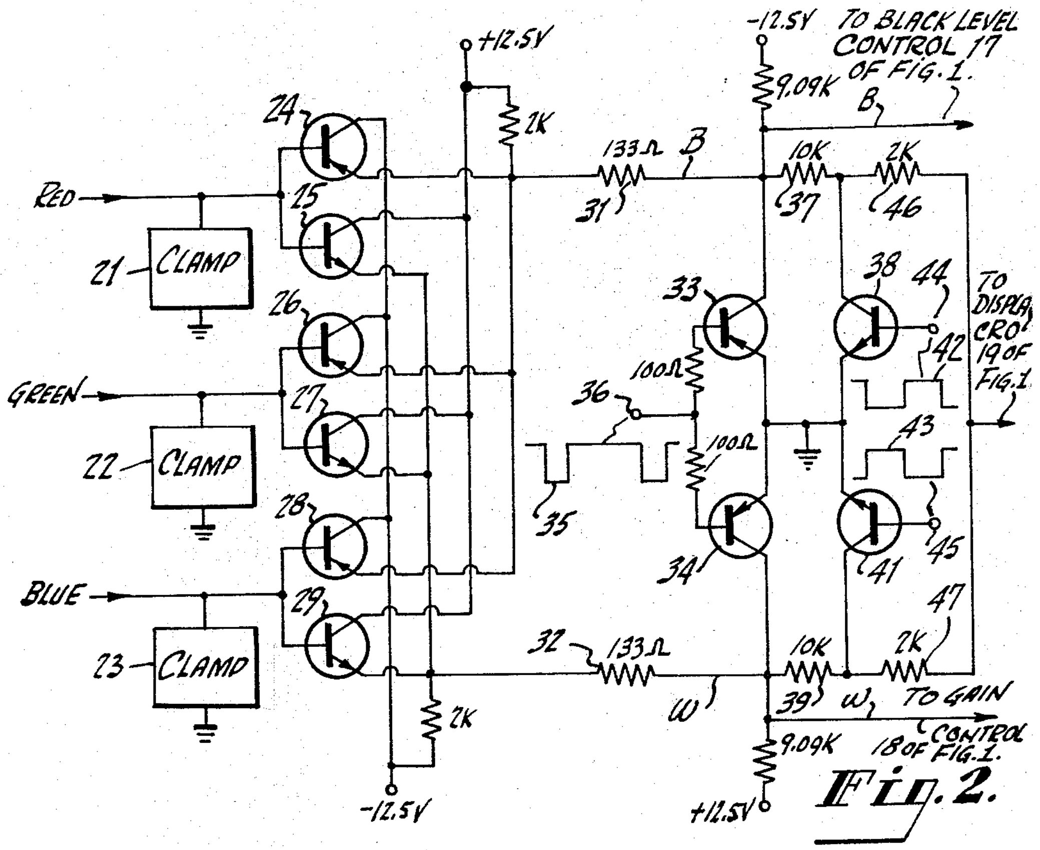

This invention relates to color television systems and particularly to apparatus for processing video signals derived from an image pickup device which produces a luminance signal and three different color signals.

The color television signal required to be transmitted according to the U.S. standards promulgated by the Federal Communications Commission includes a luminance component and two color difference components known as I and Q signals. In the past it has been the practice to employ a pickup device responsive to light derived from the subject and productive of three color signals, nominally red, green and blue. These color signals contain not only the color information derived from the subject but also luminance information. These signals have been matrixed to form a luminance signal comprising predetermined portions of the red, green and blue signals together with the two color difference I and Q signals which contain no luminance information. These are the signals which are transmitted to a receiver in which they are matrixed by combining the I and Q signals suitably with the luminance signal to produce red, green and blue signals corresponding to those originally derived from the image pickup device. These color signals then are used to reproduce the image.

In an image pickup device in which a luminance signal is derived independently of the red, green and blue color signals, it is necessary to matrix the color signals in the same manner as previously done in order to produce the I and Q color difference signals which are to be transmitted. Because the luminance signal is produced independently of the color signals there is no assurance that it will be properly related to the I and Q color difference signals for transmission to a receiver. It, therefore, becomes necessary to insure that the proper relationship between the luminance signal and the I and Q color difference signals is proper for transmission and reproduction by a receiver.

Accordingly, it is an object of the present invention to process the luminance signal and the red, green and blue color signals derived from a pickup device productive of such signals so as to enable an operator to determine the proper processing of the signals and to enable suitable control of the apparatus at a transmitter point to provide the necessary relationship among the transmitted signals.

In accordance with this invention the luminance signal and the red, green and blue color signals derived from an image pickup device are processed in separate channels of an amplifier and the red, green and blue color signals are then matrixed to produce I and Q color difference signals. The color difference signals and the luminance signal then are matrixed in the same manner as that performed in a receiver to produce red, green and blue color signals including both color and luminance information. Such signals correspond to those which would be used for image reproduction at a receiver in the absence of this invention and may not be proper for this purpose as explained previously. These signals then are subjected to an operation by which the largest and the smallest instantaneous amplitudes of any of the signals is determined. A control signal is derived for each of the largest and the smallest signals. The control signals are used respectively (1) to control the gain of all of the signals derived from the pickup device and (2) to control the black level of these signals. Additionally, these two signals are displayed on a cathode ray device so as to enable an operator to observe the range limits of the signals.

Figure 1:
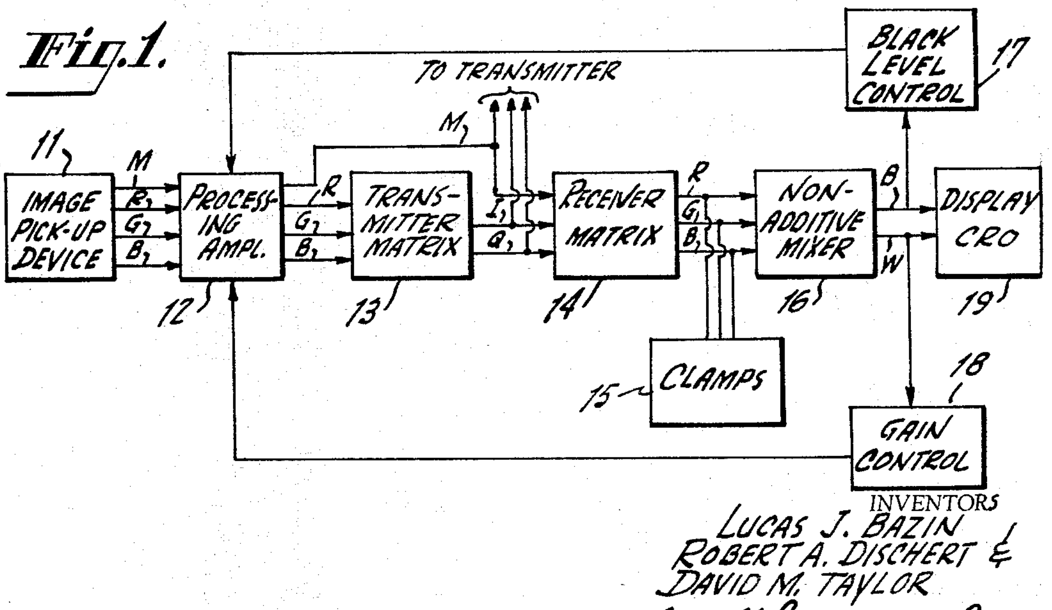

FIGURE 1 of the drawings is a block diagram of an illustrative embodiment of the invention, and FIGURE 2 is a schematic circuit diagram of a portion of the apparatus shown in FIGURE 1.

In FIGURE 1 the image pickup device 11 produces independently a luminance signal M and red, green and blue color signals R, G and B. These signals are impressed upon a processing amplifier 12 in which they are separately controlled in individual channels. The red, green and blue signals R, G and B derived from the amplifier 12 are impressed upon a transmitter type matrix 13 from which are derived the I and Q color difference signals for transmission. The luminance signal M derived from the processing amplifier is also transmitted.

The luminance signal M and I and Q signals are impressed upon a receiver type matrix 14 which functions to produce red, green and blue color signals R, G and B, respectively containing both color and luminance information. Both of these matrices are of types commonly used respectively at transmitter and receiver points. The red, green and blue signals derived from the receiver matrix are clamped by suitable clamp circuits 15 which are of the keyed variety operating during blanking intervals of the signals applied thereto.

The clamped red, green and blue color signals R, G and B are then applied to a nonadditive mixer 16, details of which are disclosed in FIGURE 2. This mixer apparatus functions to produce a control signal W representative at every instant of that one of the red, green and blue signals having the greatest amplitude. The mixer 16 also functions to produce a second control signal B which at every instant is representative of that one of the red, green and blue signals having the smallest amplitude.

The control signal B is impressed upon a black level control apparatus 17, the output of which is coupled to the processing amplifier 12 to suitably control the black level of all of the signals impressed thereon as derived from the pickup device 11. Similarly, the control signal W is impressed upon gain control apparatus 18 which in turn is coupled to the processing amplifier 12 in a manner to control the gain of all four signal channels thereof. Details of the black level and gain controls 17 and 18 are disclosed in a concurrently filed application of Robert A. Dischert and Norman P. Kellaway, Serial No. 357,029 and titled Video Signal Processing System.

The control signals W and B also are applied to a display device such as a cathode ray oscilloscope 19. For this purpose the signals W and B are applied in alternation to the oscilloscope so that the largest amplitude signal W is displayed at a greater amplitude relative to a base line than the display of the smallest amplitude control signal B. The alternate display of the two control signals W and B is effected at a rate suitable to insure that the respective traces on the oscilloscope screen persist sufficiently to enable their simultaneous viewing.

The details of the nonadditive mixer 16 of FIGURE 1 are illustrated in FIGURE 2. The red, green and blue color signals derived from the receiver type matrix 14 are clamped to ground respectively by clamps 21, 22 and 23. The red signals then are impressed upon the base electrodes of a pair of transistors 24 and 25. The green signals are impressed upon a pair of transistors 26 and 27.

The blue signals are impressed upon a pair of transistors 28 and 29. It should be noted that, in each one of the pairs, the transistors are of opposite conductivity types so that one transistor 24, for example, responds to a red signal of small amplitude and the transistor 25 responds to a red signal of large amplitude. Similar arrangements are made for the green and blue color signals. Assume that the red color signal has the smallest instantaneous amplitude of the applied red, green and blue color signals. Transistor 24 is rendered conducting which automatically biases to a nonconducting state the similar transistors 26 and 28 associated with the green and blue color signals. This red color signal then constitutes the control signal B referred to FIGURE 1 at that particular instant. This signal is impressed through a resistor 31 upon the blanking and switching apparatus to be described subsequently. Should the red color signal at any particular instant have the greatest amplitude of the red, green and blue color signals, the transistor 25 becomes conducting and automatically biases to a nonconducting state transistors 27 and 29 associated with the green and blue color signals. The red color signal conducted by the transistor 25 then constitutes the control signal W which is applied by a resistor 32 to the blanking and switching apparatus to be described.

The control signal B which is conducted by resistor 31 is applied to a blanking transistor 33 and the control signal W conducted by the resistor 32 is similarly applied to a blanking transistor 34. These transistors are rendered conducting under the control of blanking pulses 35 applied to a terminal 36 during retrace intervals of the scanning cycle. The control signals B and W, therefore, are blanked by the transistors 33 and 34 to remove any spurious effects which may be occurring during the blanking intervals.

The control signal B is further conducted through an isolating resistor 37 to a switching transistor 38. The control signal W is similarly applied through an isolating resistor 39 to a switching transistor 41. These two switching transistors are rendered alternately conducting and nonconducting under the control of switching pulses 42 and 43 applied respectively to terminals 44 and 45. The duration of each half cycle of the switching pulses, in an illustrative instance, is equivalent to the time for scanning two horizontal lines of the picture. It is to be noted that the pulses 42 and 43 are of opposite phase or polarity as applied to the respective transistors 38 and 41 so that, in one two-line interval, the control signal B is conducted through an output resistor 46 for impression upon the cathode ray oscilloscope display 19 of FIGURE 1. During alternate two line intervals the control signal W is impressed through an output resistor 47 upon the display device 19 of FIGURE 1.

The control signals B and W derived from the junction of resistors 31–37 and 32–39 respectively are applied to the black level and gain control apparatus 17 and 18 of FIGURE 1. It is to be noted that these two signals are continuously applied to the control apparatus, whereas the signals applied to the display device are impressed thereon in alternation.

What is claimed is:

1. In apparatus for processing signals in a color television system in which there are produced by a pickup device a luminance signal and red, green and blue color signals, the combination comprising:

an amplifier having individual channels respectively for said luminance signal and red, green and blue color signals;

a first matrix coupled to receive said color signals produced by said pickup device and operative to convert them into two color difference signals for further processing preparatory to transmission, each color difference signal including different proportions of said red, green and blue color signals minus any luminance signal information;

a second matrix coupled to receive said luminance and color difference signals and operative to convert them into red, green and blue color signals including said luminance signal information;

means for selecting the one of said converted red, green and blue color signals having the largest instantaneous amplitude to produce a first control signal;

means for selecting the one of said converted red, green and blue color signals having the smallest instantaneous amplitude to produce a second control signal; and means for applying said control signals to utilization apparatus including said amplifier for controlling its operation.

2. Apparatus as defined in claim 1 having:

means for controlling the white level of said luminance signal and said red, green and blue color signals in response to said first control signal; and means for controlling the black level of said luminance signal and said red, green and blue color signals in response to said second control signal.

3. Apparatus as defined in claim 1 having:

means for displaying said first and second control signals.

References Cited by the Examiner

UNITED STATES PATENTS

| | | | |
|---|---|---|---|
| 3,144,510 | 8/1964 | Farber et al. | 178—5.2 |
| 3,196,205 | 7/1965 | Bedford | 178—5.4 |

DAVID G. REDINBAUGH, *Primary Examiner.*

J. A. O'BRIEN, *Assistant Examiner.*